United States Patent [19]

Kränzle

[11] 4,202,495
[45] May 13, 1980

[54] MULTIPLE NOZZLE HEAD

[76] Inventor: Josef Kränzle, Auerstrasse 42a, 7918 Illertissen, Fed. Rep. of Germany

[21] Appl. No.: 932,012

[22] Filed: Aug. 8, 1978

[30] Foreign Application Priority Data

May 3, 1978 [DE] Fed. Rep. of Germany ....... 2819345

[51] Int. Cl.$^2$ ............................................. B05B 1/16
[52] U.S. Cl. ....................................... 239/1; 137/38; 239/443; 239/569
[58] Field of Search ................................ 239/390–396, 239/443–449, 526, 569, 570, 572, 579, 1; 137/38, 119, 864, 872

[56] References Cited

U.S. PATENT DOCUMENTS 2,731,300  1/1956  Jansen ................................. 239/446

FOREIGN PATENT DOCUMENTS 25717 of 1910 United Kingdom ..................... 239/447
217297 6/1924 United Kingdom ..................... 239/444
600855 4/1948 United Kingdom ..................... 239/443

Primary Examiner—Robert B. Reeves
Assistant Examiner—Andres Kashnikow
Attorney, Agent, or Firm—Blanchard, Flynn, Thiel, Boutell & Tanis

[57] ABSTRACT

A multiple nozzle head for use on jet pipes or guns particularly adapted for cleaning equipment. A contactless change-over device is provided on the end of the jet pipe, which change-over device has a sealing element movable therein. The change-over device has an inlet port and at least two outlet ports with the sealing element being movable between the outlet ports. By orienting the jet pipe in a specific position, with the liquid turned off, the sealing element is gravitationally moved to a desired location so that when the liquid supply is turned on again, the sealing element will be held in the adjusted position by the liquid pressure.

11 Claims, 9 Drawing Figures

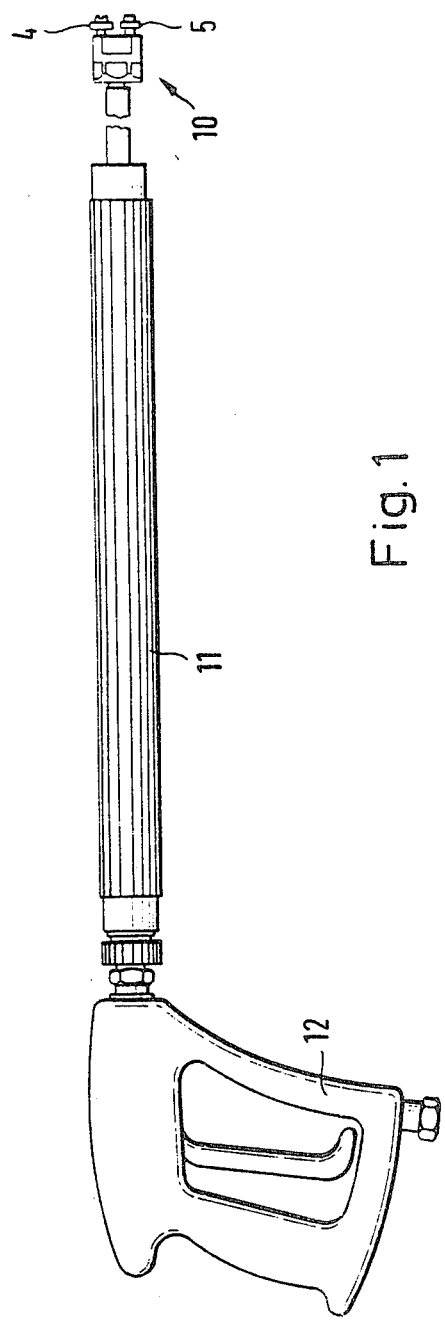

MULTIPLE NOZZLE HEAD

FIELD OF THE INVENTION

The invention relates to a multiple nozzle head, in particular for mounting on jet pipes or guns for cleaning equipment, with a contactless change-over from one nozzle to another.

BACKGROUND OF THE INVENTION

When vehicles and other apparatus are cleaned, it is often practical to have available different jets and at different pressures. For this it is necessary to employ different nozzles, say a circular jet nozzle and a flat jet nozzle.

The problem of the invention is to provide a multiple nozzle head which is of compact and simple construction and makes it possible to change over from one nozzle to another without touching the nozzle head.

According to the invention this is achieved in that an internal chamber having a central inlet is provided in the head with at least two passageways to which nozzles can be connected being provided in the wall of the internal chamber which is opposite the inlet. A freely movable sealing element which is able to close one or more of the passageways is disposed in the internal chamber.

The multiple nozzle head according to the invention has the advantage that the desired nozzle can be selected merely by slightly turning the jet pipe bearing the multiple nozzle head in the turned-off state. Moreover, there is also the possibility of working with both nozzles. The design according to the invention is such that the multiple nozzle head is extremely simple to produce and has a size corresponding practically speaking to that of single nozzle head.

BRIEF DESCRIPTION OF THE DRAWINGS

Other features and advantages will appear from the following description with reference to the drawings, in which:

FIG. 1 is a general view of a jet pipe or gun employing a multiple nozzle head according to the invention;

DETAILED DESCRIPTION

FIG. 1 shows a conventional jet or high pressure pipe with a pistol grip 12 and a hand support 11 extending away from the pistol grip. A multiple nozzle head 10 is mounted on the outlet end of the hand support which, for clarity, is shown turned through 90° in FIG. 1 in order to make the two nozzles 4 and 5 visible. The multiple nozzle head embodying the invention may be mounted on jet pipes of any kind or on other similar devices.

Figure 3:
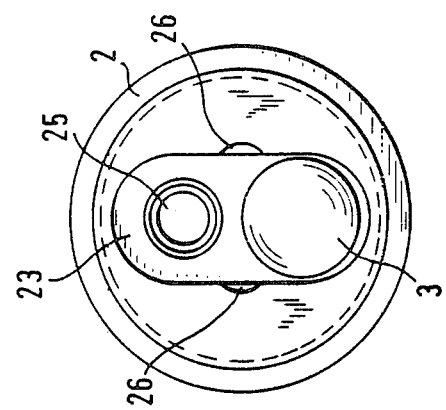
FIG. 3 is a plan view of the open multiple nozzle head according to FIG. 2.
Figure 2:
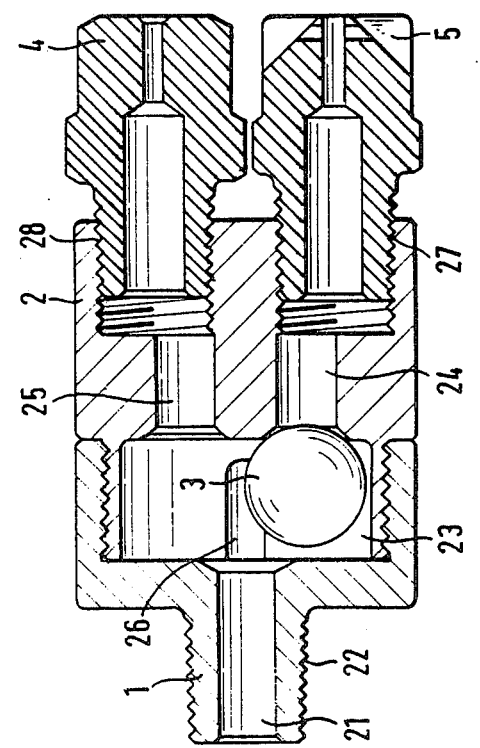
FIG. 2 is a horizontal section of a preferred constructional form of a multiple nozzle head as seen from above.

FIG. 2 shows details of a preferred embodiment of a multiple nozzle head. An inlet part 1 and an elongated outlet part 2 can be screwed together or connected in some other way to form an internal chamber 23 in which there is provided a sealing element, such as a ball 3 in the illustrated embodiment. The height of the internal chamber 23 is precisely chosen so that the ball 3 can move freely. For high-pressure types of cleaning equipment which are operated at pressures between 100 and 200 bars, the inlet and/or outlet parts 1 and/or 2 may be of metal, for example steel, aluminum or preferably brass. For low-pressure equipment, however, they may also be made of plastic. The ball 3, which may also be replaced by a sealing element of a different shape, for instance a disc, consists of refined steel or of some other material suitable for the material of the parts 1 and 2.

In the preferred embodiment, two nozzles are provided on the multiple nozzle head, namely a circular jet nozzle 4 and a flat jet nozzle 5, both of commercial type. They are screwed into the outlet part 2 by means of threads 28 and 27, respectively, or are fixed to the part 2 in some other way. Passageways 25 and 24, respectively, extend from the internal chamber 23 to the nozzles 4 and 5. A particularly compact arrangement is obtained in the preferred embodiment owing to the fact that the two passageways 24 and 25 extend side by side, parallel and as close as possible to one another. Moreover, their axes preferably extend parallel to the longitudinal axis of the outlet part. On the other hand, if a certain inclined position of the nozzles is desired, the axes of the passageways 24 and 25 may also be slightly inclined with respect to the axis of the outlet part 2.

The inlet part 1 has an externally threaded connector end 22 thereon with a central inlet or supply bore 21 extending therethrough, the axis of which preferably coincides with the longitudinal axis of the outlet part 2. The connector end 22 assures that the multiple nozzle head can be connected to a conventional jet pipe (FIG. 1). It is a particular advantage of the preferred embodiment of the multiple nozzle head that different multiple nozzle heads do not have to be produced in each case for different kinds and diameters of jet pipe connections, but merely different inlet parts 1 with suitably matched connector ends 22 need be provided, while the outlet part 2 is the same in all cases or may be of different design for various nozzles.

The internal chamber 23 in the preferred embodiment is of an elongated profile to just embrace the two passageways 24 and 25 and assure that the ball 3 has just enough play or clearance for movement, for example, from the passageway 24 to the passageway 25. On the other hand, sufficient clearance remains so that even foreign bodies of a certain size are readily allowed to pass into the passageways 24, 25 without affecting the change-over function. The inlet ends to the passageways 24 and 25 are preferably countersunk in order to provide a better seat for the ball 3.

The inlet and/or outlet parts 1 and/or 2 are either turned parts, the internal chamber 23 being milled into the outlet part, or else stampings, which in particular are hot-pressed.

Moreover, grooves 26 may be arranged opposite each other in the internal chamber, the grooves extending parallel to the longitudinal axis of the outlet part 2 and in fact in the middle between the two passageways 24 and 25. In this way, a neutral rest position is formed for the ball 3 in which it leaves both passageways 24 and 25 open, so that liquid can pass from the inlet connector end 22 to both nozzles 4 and 5.

Figure 4:
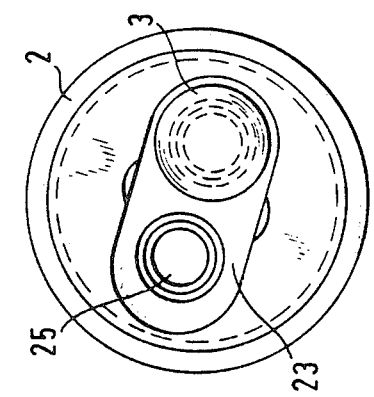
FIGS. 4 to 6 are plan views similar to FIG. 3 showing the three different positions of the multiple nozzle head after change-over.
Figure 5:
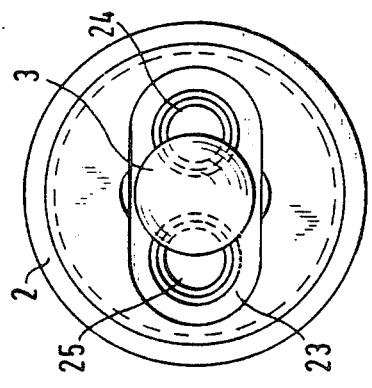
Figure 6:
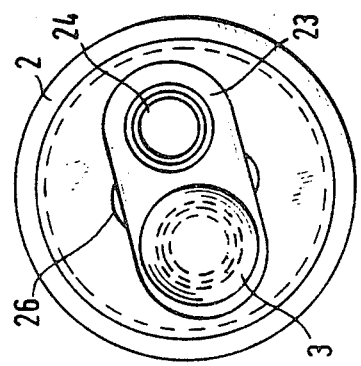

Particularly important is the mode of operation of the preferred embodiment of the multiple nozzle head. As shown in FIGS. 4 to 6, the ball 3 can adopt three different positions into which it can be brought with the liquid supply such as water, turned off. In operation, the two nozzles generally lie approximately horizontally side by side. If, for example, the nozzle 5 is to be activated, then by slightly tilting or turning the jet pipe into the position shown in FIG. 4 the ball 3 is brought in front of the outlet 25, so that when the liquid supply is turned on the ball is forced against the inlet to this passageway to close it, so that all the liquid flows through the passageway 24 to the nozzle 5.

If, on the other hand, the nozzle 4 is to be activated, the liquid supply is briefly turned off and the jet pipe is turned into the position shown in FIG. 6, so that the ball runs to the right by reason of its weight and applies itself in front of the inlet to the passageway 24. This, in turn, causes all the liquid to flow through the passageway 25 to the nozzle 4.

It is a particular advantage of the preferred embodiment of the multiple nozzle head that the two nozzles can also be fed with liquid simultaneously. This is achieved in that, with the liquid supply turned off, the jet pipe and multiple nozzle head are tilted upwardly, so that the ball 3 passes into the groove 26 and arrives over the bore of the inlet 21 and, when the liquid supply is turned on, is forced against the projection between the inlets to the passageways 24 and 25 and consequently leaves both passageways 24 and 25 free.

As already mentioned, instead of the ball a different sealing element, for instance a round or oval disc whose outside dimensions are larger than the diameters of the inlets to the passageways 24 and 25, could be employed.

In the preferred embodiment, the multiple nozzle head has two nozzles. It is possible, however, to provide three or more nozzles, for instance in the form of an equilateral polygon and more particularly a triangle in the case of three nozzles. The outlet points would then be the corner points of the triangle; another outlet could also be provided in the center of the triangle. If a ball 3 is employed as the sealing element, only one of a plurality of passageways is then closed at any given time, i.e. a plurality of nozzles are activated simultaneously each time. If, with more than two nozzles, only one nozzle is to be operative at any given time, this can be achieved by means of a suitably shaped sealing element. In the case of the three nozzles and an internal chamber having the form of an equilateral triangle, the sealing element could have an elongated form of such a nature that it just covers the inlet to two passageways, while it leaves the third free.

If a ball 3 is employed in the preferred embodiment or in modified embodiments, its diameter is chosen comparatively large with respect to the diameter of the passageways 24 and 25, for instance twice as large. Due to the fact that the liquid inlet and outlet and the nozzles are designed to be practically speaking equidirectional, a particularly compact form of construction which puts up a low resistance to the liquid is obtained.

Of course, instead of water, any other liquids or media may be used in connection with the multiple nozzle head.

Figure 7:
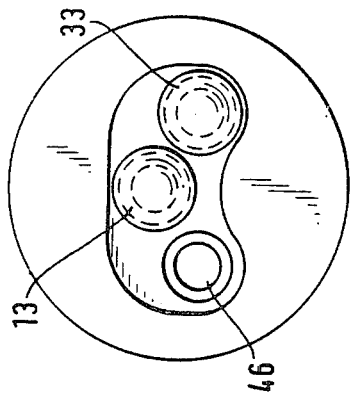
FIGS. 7 to 9 are plan views similar to FIGS. 4 to 6 of another constructional form of the multiple nozzle head.
Figure 8:
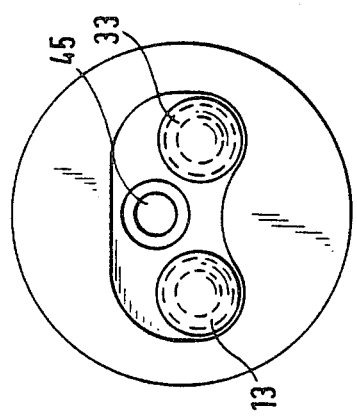
Figure 9:
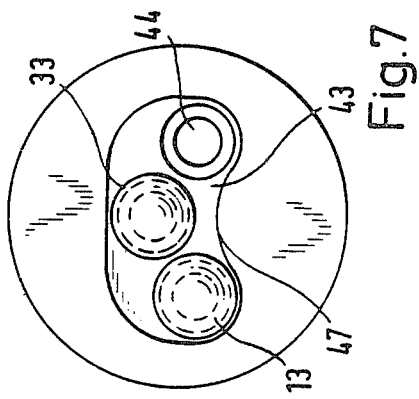

FIGS. 7 to 9 diagrammatically illustrate another constructional form of the invention in which the internal chamber 43 has the form of an arched elongated profile. Three passageways 44, 45, 46 leading to differently formed nozzles are provided. The passageways are so arranged that the inlet to the intermediate passageway is located a little above the inlets to the two outer passageways 44 and 46. The underside 47 of the internal chamber 43 is slightly curved upwards. Two balls 13 and 33 are provided as sealing elements. FIGS. 7 to 9 show the multiple nozzle head in working positions, i.e. the change-over as shown in FIGS. 4 to 6 has already taken place. This change-over is effected in a similar manner to that taking place in the case of the constructional form according to FIGS. 4 to 6. If, for example, the passageway 44 is to be opened, the jet pipe is turned slightly counterclockwise with the liquid supply turned off, so that the two balls 13 and 33 drop in front of the inlets to the passageways 46 and 45, respectively, and are applied in front of these inlets when the liquid supply is turned on. If the liquid supply is turned off, the two balls 13 and 33 drop into the position according to FIG. 8 and are consequently applied in front of the inlets to the passageways 46 and 44, respectively. If the passageway 46 is to be opened, this is achieved by slightly turning the jet pipe clockwise with the liquid supply turned off, the balls 13 and 33 being applied in front of the inlets to the passageways 45 and 44, respectively.

In a simplified constructional form, the passageway 45 could be omitted and only one ball 13 employed as a sealing element. Another modification consists in that the curve or arc 47 extends downwardly and not upwardly. In this case the inlet to the passageway 45 could be arranged either above or below the two inlets to the other passageways 44 and 46 or at the same level.

Although particular embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for contactless changing over of a multiple nozzle head, from nozzle to nozzle, the head containing an internal chamber, a central inlet on one side of said internal chamber and at least two outlet passageways on the opposite side of said internal chamber, said outlet passageways being arranged for connection of outlet nozzles thereto, at least one freely movable sealing element in said internal chamber and shiftable to close off at least one of said outlet passageways, the method including constructing the head in two parts with an inlet part carrying said central inlet for connection to a fluid supply line and an outlet part carrying said outlet passageways and said freely movable sealing element disposed between said parts in said internal chamber, securing said inlet part to said outlet part sealingly and releasably such that said inlet part is exchangeable, arranging said inlet centrally with respect to said outlet passageways, and moving the apparatus which carries the multiple nozzle head to swing the nozzle head upwardly and therewith move the sealing element into a neutral position for opening of more than one of said nozzles.

2. In a multiple nozzle head for mounting on jet pipes for use with high pressure cleaning equipment, the head being of the type providing contactless changing over from one nozzle to another, the head containing an internal chamber, a central inlet on one side of said internal chamber and at least two outlet passageways on the opposite side of said internal chamber, said outlet passageways being arranged for connection of outlet nozzles thereto, at least one freely movable sealing element in said internal chamber and shiftable to close off at least one of said outlet passageways, the improvement comprised in that said head comprises an inlet part carrying said central inlet and formed for connection to a fluid supply line, said head further comprising an outlet part carrying said outlet passageways, said inlet part and outlet part together forming said internal chamber and being sealingly and releasably connected together such that said inlet part is exchangeable, said inlet being arranged centrally with respect to said outlet passageways.

3. A multiple nozzle head according to claim 2, wherein said internal chamber is constructed as a longitudinal groove connecting said two outlet passageways.

4. A multiple nozzle head according to claim 3, wherein at least one of said inlet and outlet parts is a turned part and said longitudinal groove is milled in one said part.

5. A multiple nozzle head according to claim 2, wherein at least one of said inlet and outlet parts is a hot-pressed part.

6. A multiple nozzle head according to claim 2, wherein said outlet passageways lie as closely to one another as is permitted by the diameter of said nozzles.

7. A multiple nozzle head according to claim 2, wherein said internal chamber is kidney-shaped as seen looking along the axis of said central inlet.

8. A multiple nozzle head according to claim 2, wherein said nozzles extend from said outlet passageways and are arranged axially parallel to said central inlet.

9. In a multiple nozzle head for mounting on jet pipes for use with high pressure cleaning equipment, the head being of the type providing contactless changing over from one nozzle to another, the head containing an internal chamber, a central inlet on one side of said internal chamber and at least two outlet passageways on the opposite side of said inlet chamber, said outlet passageways being arranged for connection of outlet nozzles thereto, at least one freely movable sealing element in said internal chamber and shiftable to close off at least one of said outlet passageways, the improvement comprised in that said head comprises an inlet part carrying said central inlet and formed for connection to a fluid supply line, said head further comprising an outlet part carrying said outlet passageways, said inlet part and outlet part together forming said internal chamber and being sealingly and releasably connected together such that said inlet part is exchangeable, said inlet being arranged centrally with respect to said outlet passageways, and including means providing a countersunk neutral position for said sealing element within said internal chamber, in which said sealing element maintains more than one outlet passageway unclosed.

10. A multiple nozzle head according to claim 9, in which said internal chamber is a groove extending substantially diametrally of the inlet and of said outlet part, said groove having an outlet wall penetrated by said outlet passageways, an opposed inlet wall formed by an end surface of said inlet part and through which said central inlet extends, said groove further having substantially chordally extending side walls along and between which said sealing element is movable from one outlet passageway past said central inlet to the other outlet passageway, said groove further having end walls disposed radially outboard beyond said outlet passageways and defining the limits of movement of said sealing element transversely of said head, said means providing said countersunk neutral position for said sealing element comprising a diametrally opposed pair of groovelike depressions in the otherwise substantially smooth surface of the transversely extending side walls of said groove, said groovelike depressions being diametrally opposed across the axis of said central inlet and extending axially of said outlet part such that at least the axially central part of said groovelike depressions are engageable with said sealing element, said groovelike depressions being sized to receive a portion of said sealing element and of length to permit said sealing element to rest against said inlet wall of said groove at said central inlet, as when fluid under pressure is not being supplied to said central inlet and said head is oriented upward toward said nozzles, said groovelike depressions also being long enough to permit forward movement of said sealing element therein to engage the central portion of the outlet wall of said groove and rest between the two outlet passageways upon reapplication of fluid under pressure, said central inlet opening divergently into said groove to permit the flow of fluid under pressure past said sealing element in its last-mentioned position and into the two said outlet passageways between which said sealing element is located.

11. A multiple nozzle head according to claim 10, in which said sealing element is a ball, said central inlet and said outlet passageways being of diameter less than the ball and having parallel axes, the space diametrally between the adjacent edges of said outlet passageways being less than the diameter of said ball so that a fluid stream from said central inlet must bend around said ball centered between said outlet passageways to flow out of said outlet passageways.

* * * * *